(12) United States Patent
Sanpei et al.

(10) Patent No.: US 8,991,573 B2
(45) Date of Patent: Mar. 31, 2015

(54) DAMPER

(75) Inventors: Makoto Sanpei, Tottori (JP); Motoyuki Sunaoka, Wako (JP); Shinji Yamada, Wako (JP); Nobuyoshi Takamatsu, Wako (JP)

(73) Assignees: NOK Corporation, Tokyo (JP); Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 10/576,672

(22) PCT Filed: Nov. 10, 2004

(86) PCT No.: PCT/JP2004/016629
§ 371 (c)(1),
(2), (4) Date: Apr. 21, 2006

(87) PCT Pub. No.: WO2005/057045
PCT Pub. Date: Jun. 23, 2005

(65) Prior Publication Data
US 2007/0039793 A1    Feb. 22, 2007

(30) Foreign Application Priority Data
Dec. 12, 2003 (JP) .................. 2003-414290

(51) Int. Cl.
*C08L 23/16* (2006.01)
*F16F 15/126* (2006.01)
*F16F 7/10* (2006.01)

(52) U.S. Cl.
CPC ............ *F16F 15/126* (2013.01); *C08L 23/16* (2013.01); *C08L 2205/02* (2013.01); *C08L 2312/00* (2013.01)
USPC ........... 188/379; 525/191; 525/240; 188/378; 74/574.4

(58) Field of Classification Search
CPC .. C08L 23/16; C08L 2205/02; C08L 2312/00
USPC ............. 525/194, 232, 191, 240, 331.9, 387; 123/192.1; 188/378, 379; 74/572.2, 74/574.4
See application file for complete search history.

(56) References Cited

U.S. PATENT DOCUMENTS

| | | | | |
|---|---|---|---|---|
| 2,972,904 | A * | 2/1961 | Troyer | 74/574.4 |
| 3,884,993 | A * | 5/1975 | Gros | 525/211 |
| 4,833,195 | A * | 5/1989 | Adur et al. | 524/528 |
| 5,446,097 | A * | 8/1995 | Nonaka et al. | 525/193 |
| 2002/0068797 | A1* | 6/2002 | Ikemoto et al. | 525/192 |
| 2004/0106723 | A1* | 6/2004 | Yang et al. | 524/570 |
| 2004/0226393 | A1* | 11/2004 | Hong | 74/68 |
| 2005/0050985 | A1* | 3/2005 | Crissy | 74/574 |

FOREIGN PATENT DOCUMENTS

| | | |
|---|---|---|
| JP | 52-129753 A | 10/1977 |
| JP | 55-029528 A | 3/1980 |
| JP | 56-118440 A | 9/1981 |
| JP | 05-180267 A | 7/1993 |
| JP | 8-73679 A | 3/1996 |
| JP | 09-012793 A | 1/1997 |
| JP | 10-089409 A | 4/1998 |
| JP | 10-089410 A | 4/1998 |
| JP | 2003-082182 A | 3/2003 |

* cited by examiner

*Primary Examiner* — Irina S Zemel
*Assistant Examiner* — Jeffrey Lenihan
(74) *Attorney, Agent, or Firm* — Brinks Gilson & Lione

(57) ABSTRACT

A damper having an elastic body formed from a cross-linking product of an EPDM composition, which comprises (a) 100 parts by weight of at least one kind of EPDM, whose propylene content in sum total of ethylene and propylene in the copolymerization rubber is 35-50 wt. %, the EPDM having a Mooney viscosity (ML100) of not less than 40, (b) 5-50 parts by weight of α-olefin oligomer, which is a polymer of α-olefin represented by the general formula, $CH_2CHR$, where R is an alkyl group having 3-12 carbon atoms, with a number average molecular weight Mn of 300-1,400 and (c) 1-10 parts by weight of an organic peroxide cross-linking agent.

10 Claims, 3 Drawing Sheets

(a)          (b)

DAMPER

TECHNICAL FIELD

The present invention relates to a damper, and more particularly to a damper for absorbing vibrations of a rotating shaft, e.g. engine crankshaft, the damper being in a structure comprising a vibration body, a mass member and an elastic body through which the mass member is joined to the vibration body.

BACKGROUND ART

To absorb vibrations of crankshaft of automobile engine, a damper is fixed to a crankshaft end. The damper comprises a hub fixed to the crankshaft end by a center bolt and an annular mass member (vibration ring) provided at the outer periphery of the hub, and a rubber elastic body through which the annular mass member is joined to the hub.

Vibration isolation mechanism of a damper is to isolate vibrations by tuning the resonance frequency of the damper to that of the crankshaft, and the resonance frequency of the damper depends on the inertial mass of vibration ring and the spring constant of rubber elastic body. Furthermore, the spring constant of rubber elastic body is temperature-dependent, so the tuning has been so far made by using a spring constant at 60° C. to absorb vibrations in the temperature region of about 20° to about 100° C. as the normally usuable temperature region.

Thus, the vibration isolation effect at temperature lower than the afore-mentioned temperature region has been outside of consideration. For example, in the case of using a damper at such low temperatures such as about −30° C., the resonance frequency of the damper is far off the frequency as tuned, resulting in insufficient absorption of vibrations, i.e. increasing vibrations of crankshaft and increasing car interior noises.

With the improvement of engine performance, on the other hand, vibration input to the crankshaft is increasing. Unless torsional vibrations of the crankshaft is reduced, the vibration will increase, lowering the safety factor of parts. Thus, a damper is used to reduce the vibrations. To cope with the increasing consumption of electric power by automobile auxiliary machinery, the effective diameter of a damper must have been enlarged. In general, the larger the inertial mass of a vibration ring, the better the vibration isolation effect of a damper. Thus, the inertial mass of the vibration ring in the damper tends to increase with an increasing output of the engine and with increasing power consumption of the auxiliary machinery. On the other hand, the smaller the total inertial mass of a damper as a whole, the less the vibrations generated per se by the engine. Thus, the total inertial mass has an optimal range.

The conventional damper can suppress torsional vibrations of crankshaft only in the normal use temperature region, but in the low-temperature region its vibration isolation function sometimes fails to be fulfilled, resulting in a risk of generation of a large vibration input in excess of the fastening torque of a bolt at the bolt-fastened position. Particularly in the case of a damper with a large total inertial mass such phenomena will occur with a high possibility.

Such phenomena, when occurred, can be overcome by circulating hot water or lowering the allowable revolution rate of the engine while the temperature of rubber elastic body in the damper is elevating by heat from the engine, but additional provision of sensors, hot water pipings and engine control program for this purpose will be required, or further problems of necessary consideration of providing additional parts at narrow positions, weight increase, cost increase, etc. will appear.

Dampers with distinguished vibration isolation effect even in low-temperature circumstances while maintaining the vibration isolation effect in the normal use temperature region are now in demand. It has been proposed to use an elastic body obtained by sulfur vulcanization of an EPDM composition, whose diene component in EPDM is 5-ethylidene-2-norbornene, in a copolymerization ratio by mole of ethylene to propylene is 60/40 to 73/27, the composition further containing a liquid-α-olefin copolymer, or an elastic body obtained by sulfur vulcanization of an EPDM composition, whose diene component in EPDM is 5-ethylidene-2-norbornene, in a copolymerization ratio by mole of ethylene to propylene is 65/35 to 73/27, in a dynamic damper having a structure comprising a vibration body, a mass member and an elastic body through which the mass member is joined to the vibration body.

PATENT LITERATURE 1: JP-A-10-89409
PATENT LITERATURE 2: JP-A-10-89410

To improve the low-temperature characteristics of polymer, the proposed attempt is to impair the crystalinity of ethylene units by increasing a proportion of propylene unit, thereby making the low-temperature characteristics better and also to make the temperature dependency of rubber material better by increasing the molecular weight.

However, in the case of simple use of such EPDM polymers the glass transition point Tg shifts toward the lower temperature side by making the propylene proportion higher, and consequently the tan δ peak shifts toward the lower temperature side, so the damping characteristics of rubber material is inevitably lowered considerably. The temperature dependency of spring constant can be made better by increasing polymer molecular weight, but the damping characteristics are inevitably lowered thereby.

Thus, in the case of simple use of such EPDM polymers as a rubber member for the damper, the damping characteristics are lowered in the normal use temperature region and the strain is increased at the resonance time, though the low-temperature characteristics can be improved. As a result, the durability, etc. will be adversely affected. Furthermore, the improvement of low-temperature characteristics by polymers has a limit due to the copolymer composition, as mentioned above, and thus further improvement of the low-temperature characteristics is hard to attain.

DISCLOSURE OF THE INVENTION

Problem to be Solved by the Invention

An object of the present invention is to provide a damper having a structure comprising a vibration body, a mass member and an elastic body through which the mass member is joined to the vibration body, where the elastic body capable of balance between a change in spring constant at low temperatures and damping characteristics in the normal use temperature region is used.

Means for Solving the Problem

The object of the present invention can be attained by a damper having the afore-mentioned structure, where the elastic body is formed from a cross-linking product of an EPDM composition, which comprises:

(a) 100 parts by weight of at least one kind of EPDM, whose propylene content in sum total of ethylene and propylene in the copolymerization rubber is 35-50 wt. %, or a blend rubber of at least one kind of EPDM with EPM, whose propylene content in sum total of ethylene and propylene in the blend rubber is 35-50 wt. %, the EPDM or the blend rubber having a Mooney viscosity (ML 100) of not less than 40, (b) 5-50 parts by weight of α-olefin oligomer, which is a polymer of α-olefin represented by the following general formula:

$$CH_2=CHR,$$

where R is an alkyl group having 3-12 carbon atoms, the oligomer having a number average molecular weight Mn of 300-1,400, and (c) 1-10 parts by weight of an organic peroxide cross-linking agent.

Effect of the Invention

The present damper having a structure comprising a vibration body, a mass member, and an elastic body of a specific composition, through which the mass member is joined to the vibration body, can effectively control vibrations of a rotating shaft, e.g. crankshaft of an engine, in a temperature region of about −30° to about 100° C., and can attain a vibration isolation effect particularly even at −30° C., so such a shaft input torque as to loosen the center bolt can be prevented from occurrence. Furthermore, vibration characteristics in the low-temperature region so far sacrificed can be improved without impairing the vibration isolation effect in the normal use temperature region, thereby reducing vibrations or noises. Still furthermore, such effects as attained can unnecessitate additional provision of the afore-mentioned machinery or can solve the problems of necessary consideration of providing additional parts at narrow positions, weight increase, cost increase, etc.

The EPDM composition of the afore-mentioned Patent Literature 1 requires sulfur vulcanization, that is, the liquid ethylene-α-olefin copolymer contained in the composition is not cross-linking, but acts as a softening agent, as disclosed in its paragraph 0029. That is, any peroxide cross-linking of a liquid ethylene-α-olefin copolymer is not intended at all in Patent Literature 1.

BEST MODES FOR CARRYING OUT THE INVENTION

As shown in the perspective view of a damper fixation state in FIG. 1, damper 1 is fixed to one end of crankshaft 3, while flywheel 2 is fixed to the other end thereof. Damper 1 has a structure comprising hub 6 as a vibration body, a vibration ring 4 as a mass member and elastic body 5, through which vibration ring 4 is joined to hub 6. Its cross-sectional view along the center line is shown in FIG. 2 (a), and its front view in FIG. 2 (b). In FIG. 2 (a), numeral 7 shows a center bolt.

The elastic body is formed from a cross-linking product of an EPDM composition comprising said components (a), (b) and (c), whose propylene content in sum total of ethylene and propylene in component (a) is 35-50 wt. %, preferably 45-50 wt. % in at least one kind of EPDM or its blend rubber. When the propylene content is below 35 wt. %, a change in spring constant in the low-temperature region will be increased, whereas, when the propylene content is above 50 wt. %, not only the low-temperature characteristics will deviate from optimal values, but also the normal state physical properties and processability will be lowered. Preferably, Mooney viscosity (ML100) of component (a) is not less than 40, usually 40-110. When Mooney viscosity (molecular weight) is less than 40, a change in spring constant in the normal use temperature region will be increased. At least one kind of EPDM containing about 4 to about 12 wt. % of any diene component such as 5-ethylidene-2-norbornene, dicyclopentadiene, vinylide-nenorbornene, etc. as copolymerized in the copolymer, is used as EPDM in component (a).

In the case of using only such component (a) of at least one kind of EPDM or its blend rubber, no good vibration characteristics in the normal use temperature region is obtained, but addition of an appropriate amount of α-olefin oligomer having an appropriate molecular weight thereto as component (b) can improve not only the problem of damping characteristics in the normal use temperature region, but also the low-temperature characteristics up to a region in excess of the improvement limit on the low-temperature characteristics imposeds by the polymers, and also can balance between the low-temperature characteristics and the vibration characteristics in the normal use temperature region at a higher level.

Furthermore, the addition of α-olefin oligomer can improve the fluidity of compound. That is, the fluidity problem of compound, when high molecular weight polymers are used at a high hardness, high filling density compounding, can be overcome, thereby improving the moldability, joint failure, etc.

The α-olefin oligomer for use in the present invention is at least one kind of α-olefin oligomers, which are polymers of α-olefin represented by the following general formula:

$$CH_2=CHR,$$

where R: an alkyl group having 3-12 carbon atoms, with a number average molecular weight Mn of 300-1,400, preferably 400-1,000. The polymer side chain alkyl group has 3-12 carbon atoms, preferably 6-10, more preferably 8. The reason why 8 carbon atoms are more preferable is that a higher viscosity index (index showing the temperature dependency of viscosity) and a lower fluidized point can be obtained. The heat resistance and volatility are largely affected by Mn value. At the same Mn value, the more the side chain carbon atoms, the better the balance between the heat resistance and the low-temperature characteristics.

α-olefin oligomers having an Mn value of less than 300 undergoes volatilization at the cross-linking or heat aging, resulting in considerable deterioration of physical properties, whereas those having an Mn value of more than 1,400 have no remarkable effect on the improvement of low-temperature characteristics. The component (b) is used in a proportion of about 5 to about 50 parts by weight, preferably about 10 to about 20 parts by weight, on the basis of 100 parts by weight of the component (a). Below about 5 parts by weight, the effect on the improvement of low-temperature characteristics and on the improvement of damping characteristics in the normal use temperature region are low, and the effect on the improvement of the fluidity of compound is so low to deteriorate the moldability at a high hardness and high filling density compounding, whereas above about 50 parts by weight moldability, particularly as to kneadability, mold untackiness, etc., will be deteriorated.

Paraffinic plasticizers can be also used together with the α-olefin oligomer. Paraffinic plasticizers (mineral oils) are mixtures of hydrocarbons having a certain degree of molecular weights and various main structures such as straight chain structures, cyclic structures, etc. with various side chain structures, obtained by rough refining of crude oil, including precipitation and filtration, atmospheric distillation and vacuum distillation of residues, chemical scrubbing or hydrogenation of the remaining components after the distillations (e.g. aromatic compounds, sulfur compounds, etc.) and removal of wax components by dewaxing, with different in structures from the α-olefin oligomers having definite side chain structures.

The organic peroxide cross-linking agent as component (c) for use in the present invention is organic peroxides usually used in the EPDM cross-linking such as dicumyl peroxide, 2,5-dimethyl-2,5-bis(t-butyl peroxy)-hexane, 2,5-dimethyl-2,5-bis(t-butyl peroxy)hexine-3, etc. and is used in a proportion of about 1 to about 10 parts by weight, preferably about 2 to about 4 parts by weight, on the basis of 100 parts by weight of component (a).

It is preferable to use a polyfunctional unsaturated compound such as triallyl isocyanurate, triallyl cyanurate, ethylene glycol dimethacrylate, trimethylolpropane trimethacrylate, N,N'-m-phenylene maleimide, etc. as usually used, together with the organic peroxide cross-linking agent. Furthermore, the EPDM composition comprising the afore-mentioned components (a), (b) and (c) as essential components can optionally contain various additives so far usually and widely used within such a range as not to violate the object of the present invention.

The EPDM composition can be prepared by kneading through a kneader, rolls, etc., and the kneading product is subjected to cross-linking molding into desired shapes by press vulcanization usually at about 170° to about 190° C. for about 2 to about 6 minutes, and, if necessary, is further subjected to oven vulcanization (secondary cross-linking) at about 150° to about 180° C. for about 1 to about 4 hours.

EXAMPLES

The present invention will be further described below, referring to Examples.

Examples 1 to 3

Blend rubbers consisting of a plurality of the following rubber components with various characteristic values, i.e. EPDM-1 to 4 (whose diene components were the same 5-ethylidene-2-norbornene [ENB]) and EPM

| Rubber component | Copolymerization composition (wt. %) | | Mooney viscosity (ML100) |
|---|---|---|---|
| | P/(E + P) | ENB | |
| EPDM-1 | 47.3 | 9.0 | 94 |
| EPDM-2 | 44.6 | 8.0 | 24 |
| EPDM-3 | 39.0 | 3.5 | 83 |
| EPDM-4 | 41.1 | 11.7 | 100 |
| EPM | 49.0 | — | 40 | were compounded with the following components in the following compounding formulation by a 3 L kneader and rolls:

| | |
|---|---|
| α-olefin oligomer (side chain octyl group, Mn 690) | Amount as given below |
| Paraffinic plasticizer (PW380, a product of Idemitsu Kosan Co., Ltd.) | Amount as given below |
| HAF carbon black | Amount as given below |
| Zinc white | 5 phr |
| Stearic acid | 0.5 phr |
| Quinoline type antioxidant | 0.5 phr |
| Dicumyl peroxide | 3 phr |

| Compounding components | Ex. 1 | Ex. 2 | Ex. 3 |
|---|---|---|---|
| EPDM-1 (parts by weight) | 30 | 45 | 45 |
| EPDM-2 (parts by weight) | 40 | 0 | 0 |
| EPDM-3 (parts by weight) | 0 | 30 | 30 |
| EPDM-4 (parts by weight) | 0 | 25 | 25 |
| EPM (parts by weight) | 30 | 0 | 0 |
| [properties of the blend rubber] | | | |
| P/E ratio by weight | 46.7/53.3 | 43.3/56.7 | 43.3/56.7 |
| Mooney viscosity (ML100) | 50 | 92.2 | 92.2 |
| α-olefin oligomer (parts by weight) | 10 | 15 | 20 |
| Paraffinic plasticizer (parts by weight) | 0 | 28.5 | 28.5 |
| HAF carbon black (parts by weight) | 70 | 60 | 50 |

The kneading products were subjected to press vulcanization at 180° C. for 6 minutes and then to oven vulcanization at 150° C. for 4 hours to obtain sheet-shaped cross-linking products for evaluation of material characteristics. For evaluation of product shaped cross-linking products the same kneading products were subjected to press vulcanization at 180° C. for 4 minutes and then to oven vulcanization at 175° C. for 1.5 hours to obtain annular cross-linking products, and the annular cross-linking products were pressure fitted between a hub and a vibration ring to obtain product models (dampers). The resulting sheet-shaped cross-linking products and product models were subjected to tests according to the following test items.

Normal state properties: Hardness (according to JIS K6253), tensile strength and elongation (according to JIS K6251).

Heat resistance: Measurement of changes in the normal state properties after heat aging at 120° C. for 180 hours.

Gehman torsional test (T100): according to JIS K6261

Change in resonance frequency: A damper was fixed to an electro-oil hydraulic torsional shaker, made by Washinomiya Works, Ltd., and acceleration sensors were fixed to the shaft and also to the annular mass body (vibration ring), respectively, and further connected to an acceleration measuring instrument to defect input vibrations and output vibration. By a resonance point tracking program, changes in resonance frequency were measured at temperatures of −30° C./60° C. and 100° C./60° C., percent changes in resonance frequency at −30° C./60° C. of less than 65% was judged to be good (◯), that of 65% to less than 70 to be fairly good (Δ), and that of 70% or more to be poor (X). Percent change in resonance frequency at 100° C./60° of less than 10% was judged to be good (◯) and that of 10% or more to be poor (X) (see FIG. 3).

Resonance magnification: A damper was fixed to an electro-oil hydraulic torsional shaker, made by Washinomiya Works, Ltd., and acceleration sensors were fixed to the shaft and also to the annular mass body (vibration ring), respectively, and further connected to an acceleration measuring instrument to detect input vibrations and output vibrations. By a resonance point tracking program, resonance magnification at the temperature of 60° C. was measured, and a resonance magnification of not more than 4.5 was judged to be good (◯), that of 4.6 to less than 5 to be fairly good (Δ), and that of 5 or more to be poor (X) (see FIG. 3).

Resonance point durability test: A damper was fixed to the same torsional shaker as above, and tested at 80° C. and ±0.1 deg. Durability to withstand 1.5 million or more runs was found to be good (◯), that to withstand one million up to less than 1.5 million runs to be fairly good (Δ), and that to withstand less than one million runs to one poor (X).

Kneadability and moldability: Mark ⊚ means no problem at all, mark ○ no specific problem as practical compounds, requiring no specific control and mark Δ kneadable, but requiring specific control.

Actual engine test evaluation: A damper was fixed to the crankshaft of an engine and subjected to durability test of rapidly increasing the engine power from the start to maximum output at the temperature of −30° C., and maximum generate torques were measured by a strain gage provided at the hub on the engine side. Maximum generate torque of less than 400 N·m was judged to be good (○), that of 400 N·m to less than 500 N·m to be fairly good (Δ), and that of 500 N·m or more to be poor (X) (see FIG. 4).

The test results are shown in the following Table 1.

TABLE 1

| Test items and evaluation | Ex. 1 | Ex. 2 | Ex.3 |
|---|---|---|---|
| Normal state properties | | | |
| Hardness (JIS A) | 75 | 65 | 55 |
| Tensile strength (MPa) | 20.0 | 19.0 | 17.5 |
| Elongation (%) | 271 | 330 | 410 |
| Heat resistance | | | |
| Change in hardness (points) | +2 | +1 | +1 |
| Percent change of tensile strength (%) | −3 | −2 | −3 |
| Percent change of elongation (%) | −4 | −3 | −2 |
| Gehman torsional test | | | |
| T100 | −54 | −54 | −54 |
| Change in resonance frequency | | | |
| −30° C./60° C. (%) | 62 | 62 | 62 |
| Evaluation | ○ | ○ | ○ |
| 100° C./60° C. (%) | −8.5 | −8.4 | −8.2 |
| Evaluation | ○ | ○ | ○ |
| Resonance magnification | | | |
| Magnification (times) | 4.4 | 4.5 | 4.5 |
| Evaluation | ○ | ○ | ○ |
| Resonance point durability test | | | |
| Evaluation | ○ | ○ | ○ |
| Kneadability-Moldability | | | |
| Evaluation | ⊚ | ○ | ○ |
| Actual engine test evaluation | | | |
| Evaluation | ○ | ○ | ○ |

Comparative Example 1

In Example 1, 100 parts by weight of EPDM-1 (P/E ratio=47.3/52.7, ML100=94) was used in place of the blend rubber and no α-olefin oligomer was used.

Comparative Example 2

In Example 1, 100 parts by weight of EPDM-2 (P/E ratio=44.6/55.4, ML100=24) was used in place of the blend rubber.

Comparative Example 3

In Example 1, 100 parts by weight of EPDM-2 was used in place of the blend rubber, no α-olefin oligomer was used, and the amount of HAF carbon black was changed to 60 parts by weight.

Comparative Example 4

In Example 1, the same amount of α-olefin oligomer with Mn=287 was used.

Comparative Example 5

In Example 1, the same amount of α-olefin oligomer with Mn=2,000 was used.

Comparative Example 6

In Example 1, no α-olefin oligomer was used, but 10 parts by weight of paraffinic plasticizer (PW380) was used.

Comparative Example 7

In Example 2, no α-olefin oligomer was used, and the amount of paraffinic plasticizer (PW380) was changed to 48.5 parts by weight and the amount of HAF carbon black was changed to 55 parts by weight.

The results obtained in the foregoing Comparative Examples are shown in the following Table 2.

TABLE 2

| | Comparative Example | | | | | | |
|---|---|---|---|---|---|---|---|
| Test items and evaluation | 1 | 2 | 3 | 4 | 5 | 6 | 7 |
| Normal state properties | | | | | | | |
| Hardness (JIS A) | 75 | 75 | 75 | 77 | 75 | 75 | 55 |
| Tensile strength (MPa) | 19.5 | 17.0 | 18.0 | 20.5 | 20.0 | 20.0 | 17.0 |
| Elongation (%) | 232 | 240 | 250 | 230 | 270 | 260 | 400 |
| Heat resistance | | | | | | | |
| Change in hardness (points) | +2 | +1 | +2 | +6 | +2 | +2 | +2 |
| Percent change of tensile strength (%) | −3 | −4 | −2 | −3 | −4 | −4 | −3 |
| Percent change of elongation (%) | −5 | −5 | −7 | −11 | −1 | −1 | −4 |

TABLE 2-continued

|  | Comparative Example | | | | | | |
| Test items and evaluation | 1 | 2 | 3 | 4 | 5 | 6 | 7 |
| --- | --- | --- | --- | --- | --- | --- | --- |
| Gehman torsion test | | | | | | | |
| T100 | −51 | −54 | −49 | −51 | −51 | −52 | −48 |
| Change in resonance frequency | | | | | | | |
| −30° C./60° C. (%) | 70 | 63 | 88 | 70 | 71 | 71 | 92 |
| Evaluation | X | ○ | X | X | X | X | X |
| 100° C./60° C. (%) | −6.2 | −13.2 | −12.1 | −8.9 | −8.4 | −8.4 | −8.0 |
| Evaluation | ○ | X | X | ○ | ○ | ○ | ○ |
| Resonance magnification | | | | | | | |
| Magnification (times) | 5.3 | 4.6 | 4.4 | 4.6 | 4.3 | 4.5 | 4.4 |
| Evaluation | X | Δ | ○ | Δ | ○ | ○ | ○ |
| Resonance point durability test | | | | | | | |
| Evaluation | Δ | ○ | ○ | — | ○ | ○ | ○ |
| Kneadability-Moldability | | | | | | | |
| Evaluation | Δ | ◎ | ◎ | ◎ | ◎ | ◎ | ○ |
| Actual engine test evaluation | | | | | | | |
| Evaluation | X | ○ | Δ | — | Δ | Δ | — |

It can be concluded from the foregoing results that:
(1) Examples 1 to 3 show that the temperature dependency of spring constant is very satisfactory in a range from the low-temperature region up to the normal use temperature region, and the damping characteristics at the normal use temperatures are satisfactory; the consequent suppression of vibration amplification at the resonance point is led to a high durability (see FIG. 5); furthermore, even if EPDM polymers with high molecular weights are used, the fluidity of the compound can be improved due to the plasiticization effect of added α-olefin oligomer, resulting in a satisfactory moldability; and any decrease in the heat resistance by adding α-olefin oligomer is not observable,
(2) P/E ratio of EPDMs used in Examples 2 and 3 are outside the optimum range (P: 45-50 wt. %), and though the low-temperature characteristics of single EPDM polymers are on the same level of those of Comparative Example 7, materials with balanced physical properties equivalent to those Example 1 can be obtained by increasing the amount of α-olefin oligomer (b), but with increasing amount of the liquid component (b) the kneadability or moldability is lowered and thus it is not preferable to add a large amount of α-olefin oligomer in excess of 50 parts by weight,
(3) Comparative Example 1 shows that due to the high molecular weight of the EPDM polymer and optimum P/E ratio the low-temperature characteristics and change in spring constant are satisfactory within the improvement limit imposed by the polymer, but the damping characteristics in the normal use temperature region are lowered, because neither oligomer nor plasticizing agent is used,
(4) Comparative Example 2 shows that the low-temperature characteristics can be further improved by adding α-olefin oligomer to the EPDM used in Comparative Example 3, but the change in resonance frequency in the normal use temperature region is likewise deteriorated,
(5) Comparative Example 3 shows that due to good P/E ratio of the EPDM the change in spring constant at low temperatures is relatively satisfactory, but due to the low molecular weight of the EPDM polymer the change in resonance frequency in the normal use temperature region is deteriorated,
(6) Comparative Example 4 shows that due to the low Mn value of added α-olefin oligomer the oligomer undergoes volatilization at the cross-linking or the physical properties are not stabilized, and particularly due to volatilization at the heat aging the change in hardness is large,
(7) Comparative Example 5 shows that the high Mn value of α-olefin oligomer, on the other hand, is less contributed to the effect on the improvement of low-temperature characteristics,
(8) Comparative Example 6 shows that due to use of a paraffinic plasticizing agent having a molecular weight on the same level in place of the oligomer the low-temperature characteristics cannot be improved over the improvement limit imposed by the polymer, as in Comparative Example 4, and
(9) Comparative Example 7 shows that due to the high Mn value of the EPDM polymer the change in spring constant in the normal use temperature region is satisfactory; due to the addition of a paraffinic plasticizing agent the damping characteristics in the normal use temperature region are improved, as in the case of addition of the oligomer, resulting in improvement of the resonance magnification, but the P/E ratio of the EPDM polymer is outside the optimum range, so the low-temperature characteristics are not improved.

EXPLANATION OF REFERENCE NUMERALS

Figure 1:
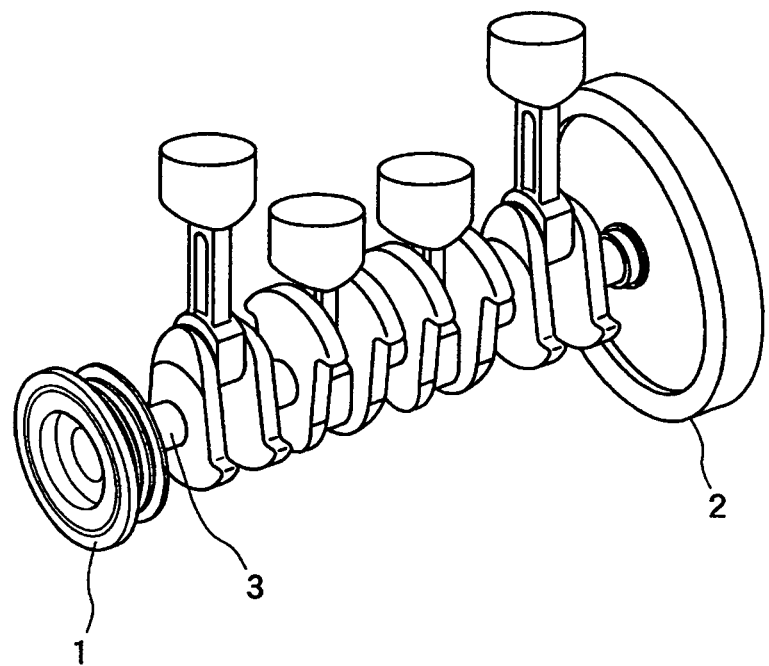
FIG. 1 a perspective view showing a damper fixation state
FIG. 2 a cross-sectional view along the center line of a damper (a) and a front view (b)
FIG. 3 a schematic view of measuring test of changes in resonance frequency and resonance magnification
FIG. 4 a schematic view of test for actual engine test evaluation
FIG. 5 a diagram showing measurement curves of E* (absolute spring constant) and tan δ in Comparative Example 1 as a, Comparative 6 as b and Example 1 as c.
Figure 2:
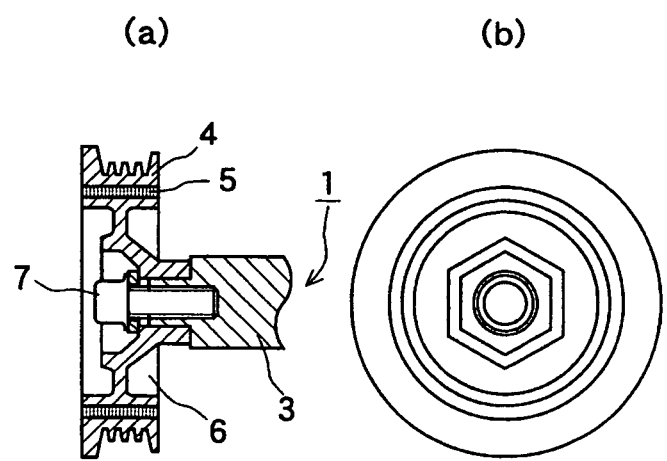
Figure 3:
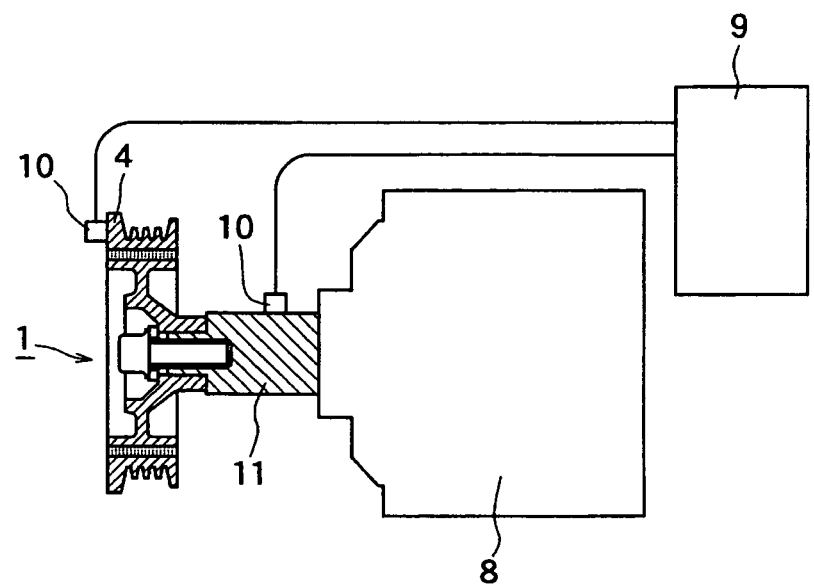
Figure 4:
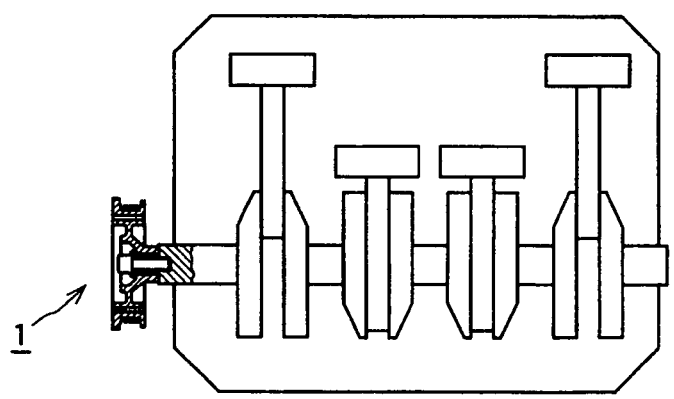
Figure 5:
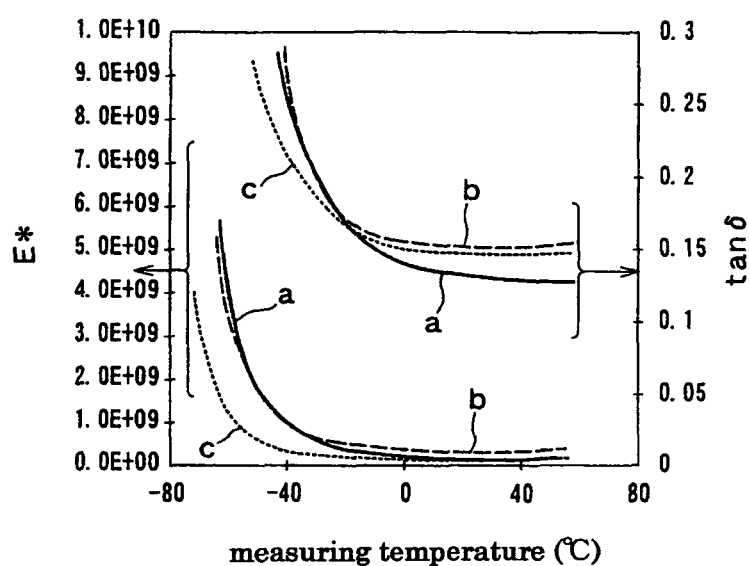

1 Damper
2 Flywheel
3 Crankshaft
4 Vibration ring (mass member)
5 Elastic body

6 Hub (vibration body)
7 Center bolt
8 Torsional shaker
9 Acceleration measuring instrument
10 Acceleration sensor
11 Shaft

The invention claimed is:

1. A damper, which comprises a vibration body, a mass member and an elastic body through which the mass member is joined to the vibration body, wherein the elastic body is formed from a cross-linking product of an EPDM composition, which comprises
    (a) 100 parts by weight of at least one kind of EPDM, whose propylene content in sum total of ethylene and propylene in the copolymerization rubber is 35-50 wt. % and whose Mooney viscosity (ML100) is 40-110,
    (b) 5-50 parts by weight of α-olefin oligomer, which is a polymer of α-olefin represented by the following general formula:

$CH_2=CHR$, where R is an alkyl group having 6-10 carbon atoms, wherein the oligomer has a number average molecular weight Mn of 443-1,000, and
    (c) 1-10 parts by weight of an organic peroxide cross-linking agent.

2. A damper according to claim 1, which comprises a hub fixed to a shaft end of a crankshaft, an annular vibration ring provided at a periphery of the hub and the elastic body through which the annular vibration ring is joined to the hub.

3. A damper according to claim 1, which is fixed to one shaft end of a crankshaft with a flywheel fixed at the other shaft end of the crankshaft.

4. A damper according to claim 1, wherein the elastic body is formed from a cross-linking product of an EPDM composition, which comprises
    (a) 100 parts by weight of at least one kind of EPDM, whose propylene content in sum total of ethylene and propylene in the copolymerization rubber is 46.7-50 wt. % and whose Mooney viscosity (ML100) is 40-110,
    (b) 5-10 parts by weight of α-olefin oligomer, which is a polymer of α-olefin represented by the following general formula:

$CH_2=CHR$, where R is an alkyl group having 3-12 carbon atoms, wherein the oligomer has a number average molecular weight Mn of 443-1,000, and
    (c) 1-10 parts by weight of an organic peroxide cross-linking agent.

5. A damper according to claim 1, wherein the elastic body is formed from a cross-linking product of an EPDM composition which comprises
    (a) 100 parts by weight of at least one kind of EPDM, whose propylene content in sum total of ethylene and propylene in the copolymerization rubber is 35-43.3 wt. % and whose Mooney viscosity (ML100) is 40-110,
    (b) 15-50 parts by weight of α-olefin oligomer, which is a polymer of α-olefin represented by the following general formula:

$CH_2=CHR$, where R is an alkyl group having 3-12 carbon atoms, wherein the oligomer has a number average molecular weight Mn of 443-1,000 and
    (c) 1-10 parts by weight of an organic peroxide cross-linking agent.

6. A damper, which comprises a vibration body, a mass member and an elastic body through which the mass member is joined to the vibration body, wherein the elastic body is formed from a cross-linking product of an EPDM composition, which comprises
    (a) 100 parts by weight of a blend rubber comprising at least one kind of EPDM and EPM, whose propylene content in sum total of ethylene and propylene in the blend rubber is 35-50 wt. % and whose Mooney viscosity (ML100) is 40-110,
    (b) 5-50 parts by weight of α-olefin oligomer, which is a polymer of α-olefin represented by the following general formula:

$CH_2=CHR$, where R is an alkyl group having 6-10 carbon atoms, wherein the oligomer has a number average molecular weight Mn of 443-1,000, and
    (c) 1-10 parts by weight of an organic peroxide cross-linking agent.

7. A damper according to claim 6, which comprises a hub fixed to a shaft end of a crankshaft, an annular vibration ring provided at a periphery of the hub and the elastic body through which the annular vibration ring is joined to the hub.

8. A damper according to claim 6, which is fixed to one shaft end of a crankshaft with a flywheel fixed at the other shaft end of the crankshaft.

9. A damper according to claim 6, wherein the elastic body is formed from a cross-linking produce of an EPDM composition, which comprises
    (a) 100 parts by weight of a blend rubber comprising at least one kind of EPDM and EPM, whose propylene content in sum total of ethylene and propylene in the copolymerization rubber is 46.7-50 wt. % and whose Mooney viscosity (ML100) is 40-110,
    (b) 5-10 parts by weight of α-olefin oligomer, which is a polymer of α-olefin represented by the following general formula:

$CH_2=CHR$, where R is an alkyl group having 3-12 carbon atoms, wherein the oligomer has a number average molecular weight Mn of 443-1,000, and
    (c) 1-10 parts by weight of an organic peroxide cross-linking agent.

10. A damper according to claim 6, wherein the elastic body is formed from a cross-linking product of an EPDM composition, which comprises
    (a) 100 parts by weight of at least one kind of EPDM, whose propylene content in sum total of ethylene and propylene in the copolymerization rubber is 35-43.3 wt. % and whose Mooney viscosity (ML100) is 40-110,
    (b) 15-50 parts by weight of α-olefin oligomer, which is a polymer of α-olefin represented by the following general formula:

$CH_2=CHR$, where R is an alkyl group having 3-12 carbon atoms, wherein the oligomer has a number average molecular weight Mn of 443-1,000, and
    (c) 1-10 parts by weight of an organic peroxide cross-linking agent.

* * * * *